US010078010B2

(12) United States Patent
Aisu et al.

(10) Patent No.: US 10,078,010 B2
(45) Date of Patent: Sep. 18, 2018

(54) PHOTOELECTRIC CONVERSION DEVICE, IMAGE GENERATION DEVICE, AND METHOD OF CORRECTING OUTPUT OF PHOTOELECTRIC CONVERSION DEVICE

(71) Applicants: Katsuhiko Aisu, Hyogo (JP); Hirofumi Watanabe, Hyogo (JP); Takaaki Negoro, Osaka (JP); Yoshinori Ueda, Hyogo (JP); Yasukazu Nakatani, Hyogo (JP); Kazuhiro Yoneda, Osaka (JP); Katsuyuki Sakurano, Hyogo (JP)

(72) Inventors: Katsuhiko Aisu, Hyogo (JP); Hirofumi Watanabe, Hyogo (JP); Takaaki Negoro, Osaka (JP); Yoshinori Ueda, Hyogo (JP); Yasukazu Nakatani, Hyogo (JP); Kazuhiro Yoneda, Osaka (JP); Katsuyuki Sakurano, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 184 days.

(21) Appl. No.: 14/978,172

(22) Filed: Dec. 22, 2015

(65) Prior Publication Data
US 2016/0195431 A1    Jul. 7, 2016

(30) Foreign Application Priority Data

Jan. 5, 2015  (JP) ................... 2015-000516

(51) Int. Cl.
*G01J 1/44* (2006.01)
*H04N 5/361* (2011.01)
(Continued)

(52) U.S. Cl.
CPC ............... *G01J 1/44* (2013.01); *H04N 5/361* (2013.01); *H04N 5/3655* (2013.01);
(Continued)

(58) Field of Classification Search
CPC ............... G01J 1/44; G01J 2001/4473; G01J 2001/444; H04N 5/378; H04N 5/361; H04N 5/3655
(Continued)

(56) References Cited

U.S. PATENT DOCUMENTS 4,310,755 A * 1/1982 Miller ............. G07B 17/00193
                                                                250/214 R
5,920,274 A * 7/1999 Gowda ................. H03M 1/123
                                                                341/155
(Continued)

FOREIGN PATENT DOCUMENTS

GB         2514576 A      12/2014
JP         64-39175        2/1989
(Continued)

OTHER PUBLICATIONS

Apr. 4, 2016 European Search Report in corresponding European Patent Application No. EP 15202148.1.

*Primary Examiner* — Seung C Sohn
(74) *Attorney, Agent, or Firm* — Cooper & Dunham LLP

(57) ABSTRACT

A photoelectric conversion device includes a pixel cell including a phototransistor, a reference cell including a reference transistor having a temperature characteristic identical to that of the phototransistor and having a fixed electrical state, an analog-to-digital converter that converts an analog output of the pixel cell into a digital output, a correction amount computation unit that computes a correction amount for the digital output of the analog-to-digital converter based on an output of the reference cell and a reference value, and a correction unit that corrects the digital output of the analog-to-digital converter based on the correction amount.

12 Claims, 7 Drawing Sheets

(51) Int. Cl.
*H04N 5/365* (2011.01)
*H04N 5/378* (2011.01)

(52) U.S. Cl.
CPC ........ *H04N 5/378* (2013.01); *G01J 2001/444* (2013.01); *G01J 2001/4473* (2013.01)

(58) Field of Classification Search
USPC ........................................ 250/208.1, 214 DC
See application file for complete search history.

(56) References Cited

U.S. PATENT DOCUMENTS

| | | | |
|---|---|---|---|
| 8,975,569 B2 | 3/2015 | Yamazaki | |
| 9,142,579 B2 | 9/2015 | Hayashi et al. | |
| 2003/0202111 A1 | 10/2003 | Park | |
| 2008/0284885 A1* | 11/2008 | Taura | H04N 5/335 348/300 |
| 2011/0215224 A1* | 9/2011 | Kobayashi | G01J 1/42 250/208.2 |
| 2014/0014818 A1 | 1/2014 | Cho et al. | |
| 2014/0353471 A1 | 12/2014 | Raynor et al. | |
| 2014/0367550 A1 | 12/2014 | Aisu et al. | |

FOREIGN PATENT DOCUMENTS

| | | |
|---|---|---|
| JP | H07-162584 | 6/1995 |
| JP | H08-009098 | 1/1996 |
| JP | H08-195877 | 7/1996 |
| JP | 2006-121137 | 5/2006 |
| JP | 2012-028975 | 2/2012 |
| JP | 2012-098575 | 5/2012 |
| JP | 2012-253741 | 12/2012 |
| JP | 2015-002464 | 1/2015 |

* cited by examiner

Prior Art

US 10,078,010 B2

PHOTOELECTRIC CONVERSION DEVICE, IMAGE GENERATION DEVICE, AND METHOD OF CORRECTING OUTPUT OF PHOTOELECTRIC CONVERSION DEVICE

CROSS-REFERENCE TO RELATED APPLICATION

The present application is based upon and claims the benefit of priority of Japanese Patent Application No. 2015-000516, filed on Jan. 5, 2015, the contents of which are incorporated herein by reference in their entirety.

BACKGROUND OF THE INVENTION

1. Field of the Invention

The present invention relates to a photoelectric conversion device, an image generation device, and a method of correcting an output of a photoelectric conversion device.

2. Description of the Related Art

An image sensor using a photodiode, such as a complementary metal oxide semiconductor (CMOS) image sensor, is known as a photoelectric conversion device.

To improve the image sensor using the photodiode, an image sensor which uses a phototransistor as a photoelectric conversion element and is adapted to provide increased sensitivity is proposed. For example, see Japanese Laid-Open Patent Publication No. 2012-028975.

However, in a case of the image sensor using the phototransistor as the photoelectric conversion element, a current gain (hFE) of the phototransistor may vary from one chip to another, and even if an optical input with an identical intensity is given, the output value of the image sensor may vary from one chip to another. In the following, the current gain (hFE) of a phototransistor may also be called a current amplification factor.

Further, the current gain hFE of the phototransistor has temperature dependency, and when ambient temperature is changed, the output value of the image sensor may vary even if the optical input with the identical intensity is given. Hence, there is a problem in that the phototransistor has output errors due to the temperature dependency.

SUMMARY OF THE INVENTION

In one aspect, the present invention provides a photoelectric conversion device using a phototransistor as a photoelectric conversion element, which is capable of correcting the chip-by-chip variations of the current gain hFE of the phototransistor and the output errors due to the temperature dependency.

In an embodiment, the present invention provides a photoelectric conversion device including: a pixel cell including a phototransistor; a reference cell including a reference transistor having a temperature characteristic identical to that of the phototransistor and having a fixed electrical state; an analog-to-digital converter configured to convert an analog output of the pixel cell into a digital output; a correction amount computation unit configured to compute a correction amount for the digital output of the analog-to-digital converter based on an output of the reference cell and a reference value; and a correction unit configured to correct the digital output of the analog-to-digital converter based on the correction amount.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION OF THE PREFERRED EMBODIMENTS

Figure 1:
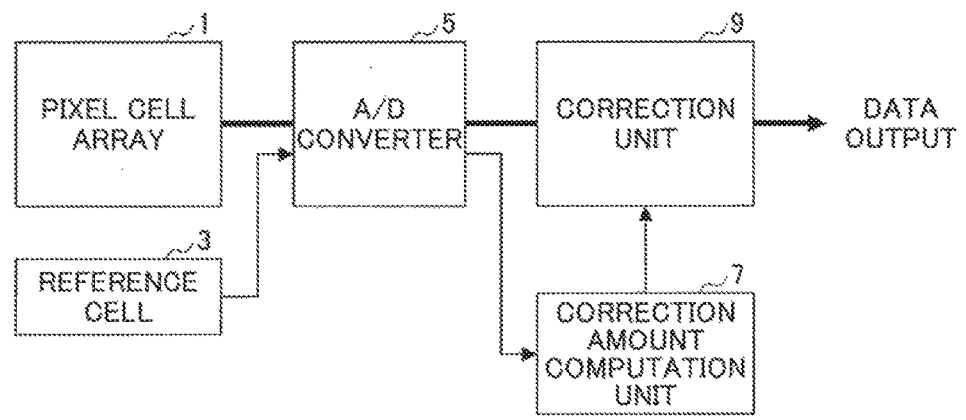
FIG. 1 is a block diagram of a photoelectric conversion device according to an embodiment.

In one embodiment, a photoelectric conversion device may include an analog-to-digital converter configured to convert an analog output signal of a reference cell into a digital signal, and a correction amount computation unit configured to compute a correction amount based on the digital signal converted from the analog output signal of the reference cell and a reference value. The correction amount computation unit may be configured to compute the correction amount based on the analog output signal of the reference cell.

Further, the photoelectric conversion device may include a plurality of pixel cells each identical to the pixel cell and a plurality of reference cells each being identical to the reference cell, and the correction amount computation unit may be configured to compute the correction amount for one of the plurality of pixel cells based on an output of one of the plurality of reference cells selected according to a placement position of the one of the plurality of pixel cells and the reference value. Alternatively, the photoelectric conversion device may include only one reference cell.

Further, the photoelectric conversion device may include a plurality of reference cells including reference transistors in which mutually different base potentials are supplied to base regions of the reference transistors and the reference transistors have different output characteristics, and a reference cell selector configured to select one of the plurality of reference cells in response to an amount of an emitter output current of the pixel cell, and the correction amount computation unit may be configured to compute the correction amount based on an output of one of the plurality of reference cells selected by the reference cell selector.

In another embodiment, a photoelectric conversion device may include a pixel cell including a phototransistor, a reference cell including a reference transistor having a temperature characteristic identical to that of the phototransistor and having a fixed electrical state, an analog-to-digital converter configured to convert an analog output of the pixel cell into a digital output, and a reference analog amount computation unit configured to compute a reference analog amount, which is supplied to the analog-to-digital converter, based on an output of the reference cell and a reference value.

Further, the photoelectric conversion device may include a plurality of pixel cells each being identical to the pixel cell and a plurality of reference cells each being identical to the reference cell, and the reference analog amount computation unit may be configured to compute the reference analog amount for one of the plurality of pixel cells based on an output of one of the plurality of reference cells selected according to a placement position of the one of the plurality of pixel cells. Alternatively, the photoelectric conversion device may include only one reference cell.

Further, the photoelectric conversion device may include a plurality of reference cells including reference transistors in which mutually different base potentials are supplied to base regions of the reference transistors and the reference transistors have different output characteristics, and a reference cell selector configured to select one of the plurality of reference cells in response to an amount of an emitter output current of the pixel cell, and the reference analog amount computation unit may be configured to compute the reference analog amount based on an output of the one of the plurality of reference cells selected by the reference cell selector.

Further, in the photoelectric conversion device, a base region of the reference transistor included in the reference cell may be connected to a terminal to which a predetermined base potential for the base region of the reference transistor is supplied from an external device. In the photoelectric conversion device, the base potential supplied to the base region of the reference transistor may be a power source voltage supplied from a power source line or a power source voltage converted into a predetermined voltage value.

In one embodiment, an image generation device may include the photoelectric conversion device according to the above-described embodiments. Examples of the image generation device may include a digital camera, an in-vehicle camera, a camera for medical use, and a vein authentication camera.

In one embodiment, a method of correcting an output of a photoelectric conversion device may include arranging in the photoelectric conversion device a pixel cell including a phototransistor, and a reference cell including a reference transistor having a temperature characteristic identical to that of the phototransistor and having a fixed electrical state, and correcting an output of the pixel cell based on an output of the reference cell and a reference value.

The photoelectric conversion device according to one embodiment is configured to correct the chip-by-chip variations of the current gain hFE of the phototransistor and the output errors due to the temperature dependency.

A reference cell including a reference transistor having a temperature characteristic identical to that of a phototransistor of a pixel cell is prepared for the correction. The temperature characteristic of the phototransistor is a current output characteristic of the phototransistor to a temperature change.

A data item is acquired from the reference cell by performing an A/D conversion (analog-to-digital conversion) using a circuit and a method which are the same as those of the pixel cell for acquiring light signal intensities. The output of the reference cell is known beforehand and it is possible to determine how much is the change of the output of the pixel cell due to the manufacture variation of the current gain hFE and the temperature characteristic. By correcting the change of the output of the pixel cell using a digital multiplier, the chip-by-chip variations of the current gain hFE of the phototransistor and the output errors due to the temperature dependency are corrected.

In the above embodiment, the data item is corrected directly based on the information acquired by the analog-to-digital conversion. Alternatively, in another embodiment, a reference input signal to an A/D converter may be generated using an analog data item from a reference cell, and an analog data item from a pixel cell may be converted by the analog-to-digital conversion using the reference input signal.

In the photoelectric conversion device according to the present invention, which relates to an image sensor using a phototransistor as a photoelectric conversion element, a change of a current gain is corrected in real time by using a data item from a reference cell without using a feedback control.

In a CMOS image sensor, usually, electric charge is accumulated in a photodiode in response to light and a pixel cell outputs a corresponding voltage by a source follower formed of a MOS transistor. In a charge coupled device (CCD) image sensor, the electric charge accumulated in the photodiode in response to light is transferred and the output voltage is acquired.

In both the CMOS image sensor and the CCD image sensor, electric charge is accumulated in a photodiode and a corresponding signal is output from the photodiode. A value of voltage produced by dividing the electric charge for the photoelectric conversion by a capacity of the photodiode is obtained as a magnitude of the signal. Further, in a certain case, the electric charge of the photodiode is transferred to another capacitance element within a pixel cell, and the voltage is amplified by a value corresponding to a ratio of a capacitance value of the capacitance element to a capacitance value of the photodiode to increase the sensitivity. It is known that the gain acquired in this manner is usually in a range from several times to ten times.

On the other hand, when the phototransistor is used as the photoelectric conversion element, the electric charge obtained by the photoelectric conversion is amplified by the current amplification function of the phototransistor and usually it is expected that the signal amplification is increased in a range from 50 times to 500 times. By using the phototransistor as the photoelectric conversion element, it is possible to provide an image sensor having a sensitivity higher than those of CMOS image sensors and CCD image sensors.

However, in the case of the photoelectric conversion device using the phototransistor, it is difficult to provide a desired current gain of the phototransistor for each of the chips, and there are the chip-by-chip variations of the current gain of the phototransistor. Such variations of the current gain are significant and not negligible. It is preferred to provide a photoelectric conversion device which is capable of correcting the variations of the current gain of the phototransistor. Further, the current gain of the phototransistor varies depending on the ambient temperature and it is preferred to provide a photoelectric conversion device which is capable of correcting the variations of the current gain of the phototransistors and the output errors due to the temperature dependency.

Figure 11:
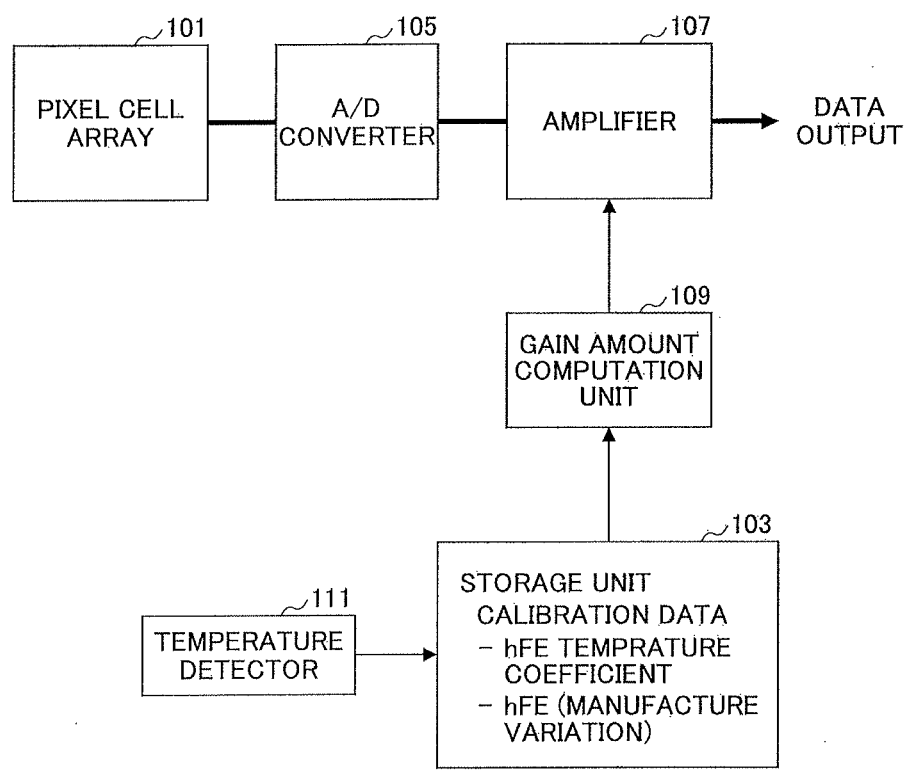
FIG. 11 is a block diagram for explaining a generally known method of correcting an output of an image sensor using a phototransistor.

Next, a generally known method of correcting an output of an image sensor using a phototransistor is explained with reference to FIG. 11.

During a product test, a data item of the current gain (hFE) of a phototransistor arranged in a pixel cell array 101 is measured on a chip-by-chip basis. Further, during the product test, a current gain temperature coefficient which indicates changes of the current gain of the phototransistor to temperature changes is also measured on a chip-by-chip basis.

These measurement data items are stored in a storage unit 103, and, for example, the storage unit 103 is made of a nonvolatile memory. The storage unit 103 in which the measurement data items are stored is used in combination with the chip of the pixel cell array 101 from which the measurement data items are acquired.

An analog signal of the phototransistor arranged in the pixel cell array 101 is converted into a digital signal by an A/D converter 105, and the digital signal from the A/D converter 105 is amplified by an amplifier 107. A temperature detector 111 is configured to detect a temperature of the chip of the pixel cell array 101. A gain amount computation unit 109 is configured to compute a correction amount for the current gain of the amplifier 107 based on the data item stored in the storage unit 103 and the temperature detected by the temperature detector 111. The current gain of the amplifier 107 is corrected based on the correction amount from the gain amount computation unit 109.

By using the above procedure, it is possible to correct the output of the image sensor. However, several problems arise. For example, the storage unit 103 and the temperature detector 111 must be prepared for the image sensor. The measurement data items must be acquired beforehand at a time of the product test. Further, it is necessary to manage the chip of the pixel cell array 101 and the measurement data items in combination.

Next, a description will be given of embodiments with reference to the accompanying drawings.

FIG. 1 is a block diagram of a photoelectric conversion device according to an embodiment.

As shown in FIG. 1, the photoelectric conversion device includes a pixel cell array 1 in which pixel cells including phototransistors are arranged in rows and columns, and includes one or more reference cells 3 which are separate from the pixel cells. Each of the reference cells 3 includes configured to have a temperature characteristic identical to a temperature characteristic of the phototransistors included in the pixel cell array 1.

An A/D converter 5 is configured to convert an analog output of the pixel cell array 1 into a digital output. In the A/D converter 5, similar to digital data items which are acquired sequentially from the pixel cells of the pixel cell array 1, a digital data item is acquired from the reference cell 3. For example, this is processed as if the number of the pixel cell arrays 1 is increased with the reference cell 3.

The data item acquired from the reference cell 3 reflects a temperature characteristic of the reference transistor included in the reference cell 3 at the present time. If a data item acquired from a reference chip at a given reference temperature is known beforehand, a correction amount (gain) for correcting the digital output of the A/D converter 5 can be easily computed.

In the photoelectric conversion device shown in FIG. 1, a correction amount computation unit 7 is configured to compute a gain (correction amount) for correcting the digital output of the A/D converter 5. Specifically, the correction amount computation unit 7 is configured to compute a correction amount for correcting the digital output of the A/D converter 5 based on an output of the reference cell 3 and a reference value. In the photoelectric conversion device shown in FIG. 1, a correction unit 9 (which includes an amplifier) is configured to correct the digital output of the A/D converter 5 based on the gain (the correction amount) computed by the correction amount computation unit 7.

Acquisition of a data item from the reference cell 3 may be performed synchronously with a time of data acquisition to acquire data items from the pixel cells included in the pixel cell array 1. Alternatively, the acquisition of a data item from the reference cell 3 may be skipped suitably. When one reference cell 3 is included in the photoelectric conversion device, the data items acquired from the reference cell 3 is used. When a plurality of reference cells 3 are included in the photoelectric conversion device, an average of data items acquired from some of the plurality of reference cells 3 may be used. Alternatively, when a plurality of reference cells 3 are included, one of respective data items acquired from the plurality of reference cells 3 may be selected and used according to a placement position of a corresponding pixel cell arranged in the pixel cell array 1.

Figure 2:
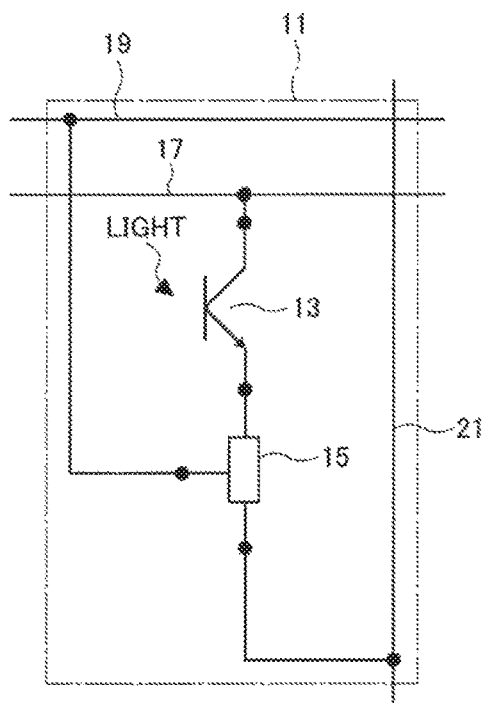
FIG. 2 is a circuit diagram of an example of a pixel cell.

FIG. 2 is a circuit diagram of an example of a pixel cell 11. As shown in FIG. 2, the pixel cell 11 includes a phototransistor 13 (which is made of a bipolar transistor) used as a photoelectric conversion cell. In the pixel cell 11, a cell selection switching element 15 is included and an output of the phototransistor 13 is received at the cell selection switching element 15 as a current from the pixel cell 11. A collector of the phototransistor 13 is connected to a power source line 17. An emitter of the phototransistor 13 is connected to the cell selection switching element 15.

Switching ON/OFF the cell selection switching element 15 is controlled by a control line 19. When the cell selection switching element 15 is in an ON state, the pixel cell 11 is selected and the current from the pixel cell 11 is output to an output line 21.

When the cell selection switching element 15 is in an OFF state, the current from the pixel cell 11 is not output to the output line 21. Electric charge generated by light is accumulated as a base potential of the phototransistor 13. In this state, the base potential of the phototransistor 13 is different from an emitter potential of the phototransistor 13, in contrast to the state of the phototransistor 13 when the cell selection switching element 15 is in an ON state. Once the cell selection switching element 15 is switched ON, the output current of the pixel cell 11 is transitionally increased and the state of the phototransistor 13 becomes gradually stable.

Figure 3:
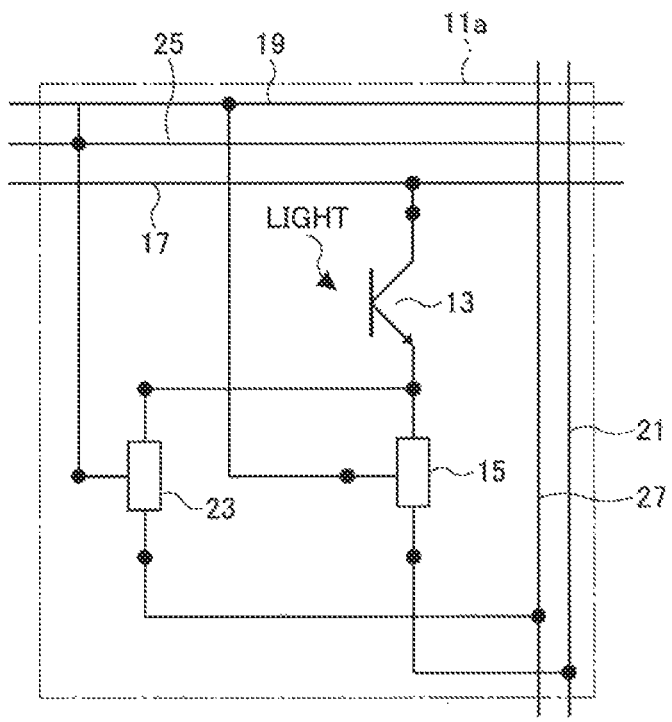
FIG. 3 is a circuit diagram of another example of a pixel cell.

FIG. 3 is a circuit diagram of an example of a pixel cell 11a. As shown in FIG. 3, the pixel cell 11a includes a second cell selection switching element 23 in addition to the elements of the pixel cell 11 shown in FIG. 2.

In the pixel cell 11a shown in FIG. 3, switching ON/OFF the second cell selection switching element 23 is controlled by a second control line 25. The second cell selection switching element 23 is connected at one end to a connection point between the phototransistor 13 and the cell selection switching element 15, and connected at the other end to a bias line 27.

In the pixel cell 11a, switching ON/OFF the cell selection switching element 15 (which is connected to the output line 21) is controlled by the control line 19, and, when the cell selection switching element 15 is switched ON, the current of the phototransistor 13 is output to the output line 21 via the cell selection switching element 15, which is similar to the operation of the pixel cell 11 shown in FIG. 2.

When the cell selection switching element 15 is in an OFF state and the pixel cell 11a is not selected, the second cell selection switching element 23 is switched ON by activating the second control line 25 after the expiration of a predetermined time interval from a start of the OFF state of the cell selection switching element 15. Then, the second cell selection switching element 23 is in an ON state, and the current of the phototransistor 13 is output to the bias line 27.

The predetermined time interval is a non-zero time. For example, the second cell selection switching element 23 may be switched ON immediately after a start of the OFF state of the cell selection switching element 15. Alternatively, the second cell selection switching element 23 may be switched ON at a subsequent time from a start of the OFF state of the cell selection switching element 15. The second cell selection switching element 23 is electrically conductive only for an arbitrary time interval between a start of the ON state of the second cell selection switching element 23 and a start of the selection of the pixel cell 11a. Hence, the state of the phototransistor 13 of the pixel cell 11a which is not selected may be controlled more flexibly than in the case of the pixel cell 11 shown in FIG. 2. For example, the pixel cell 11a is capable of controlling an exposure time, a reset time, and a reset potential of the phototransistor 13.

Note that the pixel cell for use in the photoelectric conversion device according to the invention is not limited to the above-described embodiments, and modifications may be made for the photoelectric conversion device using the phototransistor as the photoelectric conversion element.

Figure 4:
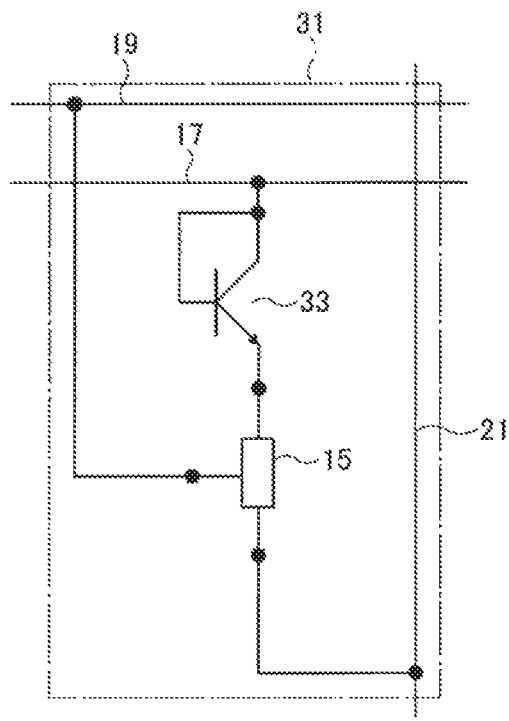
FIG. 4 is a circuit diagram of an example of a reference cell.

FIG. 4 is a circuit diagram of an example of a reference cell 31. As shown in FIG. 4, the reference cell 31 includes a reference transistor 33 instead of the phototransistor 13, which differs from the pixel cell 11 shown in FIG. 2. Other elements of the reference cell 31 shown in FIG. 4 are essentially the same as corresponding elements of the pixel cell 11 shown in FIG. 2.

In the reference cell 31 shown in FIG. 4, the reference transistor 33 has a shape and a temperature characteristic which are essentially the same as a shape and a temperature characteristic of the phototransistor 13 in the pixel cell 11 of FIG. 2. For example, a structure of an emitter region, a collector region and a base region of the reference transistor 33 is essentially the same as the corresponding structure of the phototransistor 13. However, the reference transistor 33 differs from the phototransistor 13 in that the base region of the reference transistor 33 is electrically connected to the power source line 17. Hence, a base potential of the reference transistor 33 is fixed to a potential of the power source line 17.

The reference cell 31 in which the operating state of the reference transistor 33 is electrically fixed as shown in FIG. 4 is prepared. By measuring the output of the reference transistor 33 of this reference cell 31, variations of the output of the reference transistor 33 under predetermined conditions may be obtained in an integrated manner including the conformance and the temperature characteristic of the reference cell 31.

Figure 5:
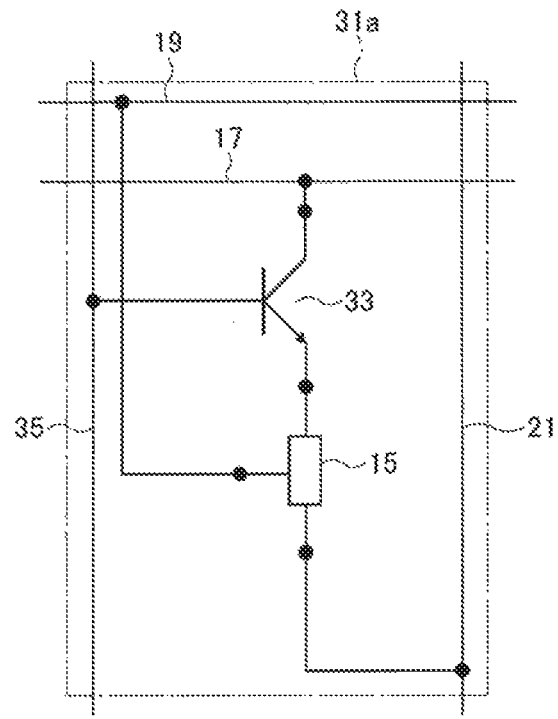
FIG. 5 is a circuit diagram of another example of a reference cell.

FIG. 5 is a circuit diagram of another example of a reference cell 31a. The reference cell 31a shown in FIG. 5 differs from the reference cell 31 shown in FIG. 4 in that the reference cell 31a includes a reference transistor 33 having a base region connected to a bias line 35.

The bias line 35 is connected to a terminal to which a predetermined base potential for the base region of the reference transistor 33 is supplied from an external device. Hence, the base potential of the reference transistor 33 may be set to an appropriate potential from the outside for allowing the reference cell 31a to operate to have the characteristic of the pixel cell 11.

The current gain hFE of a bipolar transistor is not necessarily kept at the same value when the output current of the emitter of the bipolar transistor varies. In a case of a bipolar transistor of a certain type, the current gain may greatly vary depending on the changes of the emitter output current.

For example, it is assumed that two or more reference cells 31a are arranged and different base potentials are supplied to the base regions of the reference transistors 33. By selecting one of the reference cells 31a depending on the value of the emitter output current of the phototransistor 13 of the pixel cell 11, errors due to the current gain changes according to the emitter output current changes may be corrected.

The reference cell in the photoelectric conversion device according to the invention is not limited to the foregoing embodiments and may be modified if the reference cell operates to have the characteristic of the phototransistor.

Figure 6:
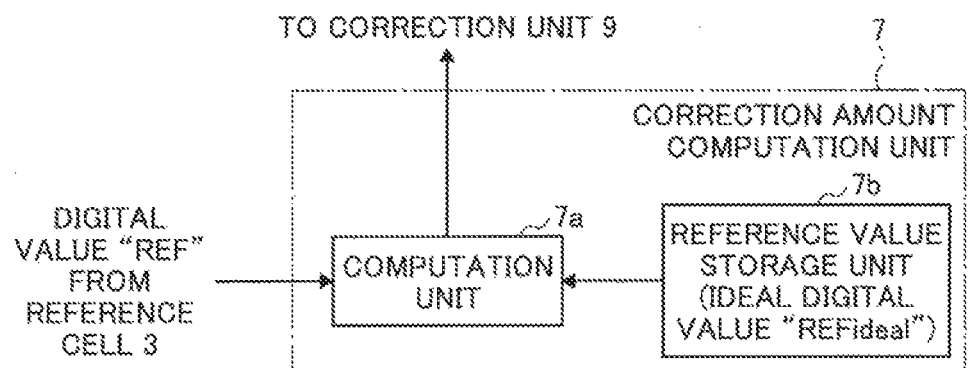
FIG. 6 is a block diagram of an example of a correction amount computation unit.

FIG. 6 is a block diagram of an example of the correction amount computation unit 7. As shown in FIG. 6, the correction amount computation unit 7 includes a computation unit 7a and a reference value storage unit 7b.

The reference value storage unit 7b is configured to store an ideal digital value (REFideal), which is acquired from the reference cell 3, as a reference value. This ideal digital value is predetermined during the design phase.

The computation unit 7a is configured to compute a gain (correction amount) supplied to the correction unit 9 based on the digital signal (REF) which is generated by the conversion of the analog output signal of the reference cell 3 by the A/D converter 5, and the ideal digital value (REFideal) from the reference value storage unit 7b. For example, the computation unit 7a computes the gain (which is supplied to the correction unit 9) by dividing the ideal digital value (REFideal) by the digital value (REF) from the reference cell 3 (gain=REFideal/REF).

The correction unit 9 (which includes an amplifier) is configured to correct the digital output of the A/D converter 5 based on the gain computed by the correction amount computation unit 7.

The ideal digital value stored in the reference value storage unit 7b may be set to an identical value among a plurality of chips. This ideal digital value is constant and does not vary by a temperature change. Hence, the photoelectric conversion device according to the embodiment shown in FIG. 1 is capable of correcting the chip-by-chip variations of the current gain hFE of the phototransistors arranged in the pixel cell array 1 and the output errors due to the temperature dependency.

Figure 7:
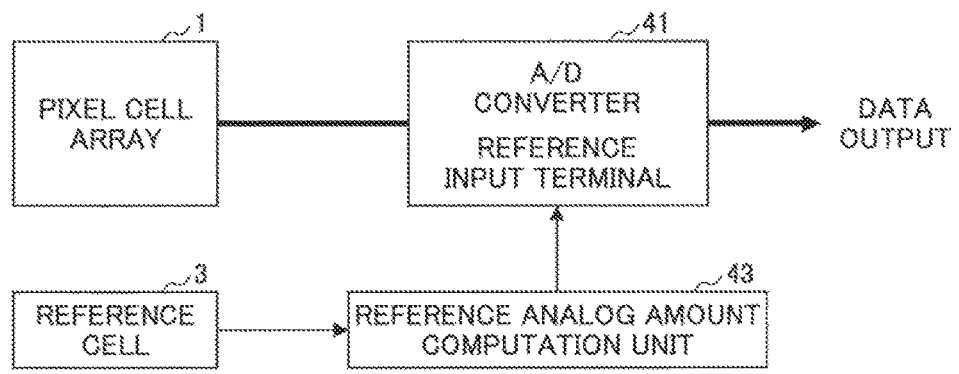
FIG. 7 is a block diagram of a photoelectric conversion device according to another embodiment.

FIG. 7 is a block diagram of a photoelectric conversion device according to another embodiment. In FIG. 7, the elements which are essentially the same as corresponding elements of the photoelectric conversion device shown in FIG. 1 are designated by the same reference numerals, and a description thereof will be omitted.

As shown in FIG. 7, the photoelectric conversion device includes the pixel cell array 1, the reference cell 3, an A/D converter 41, and a reference analog amount computation unit 43.

The reference analog amount computation unit 43 is configured to compute a reference analog amount (which is supplied to the A/D converter 41) based on the output of the reference cell 3 and the reference value. The A/D converter 41 is configured to convert an analog output of the pixel cell in the pixel cell array 1 into a digital output based on the reference analog amount from the reference analog amount computation unit 43.

The output of the reference cell 3 is indicated by a current. The reference analog amount computation unit 43 is implemented by a current voltage converter. The reference analog amount which is supplied by the reference analog amount computation unit 43 is indicated by a voltage.

In the reference analog amount computation unit 43, a ratio (I/V) of a current value (I) from the reference cell 3 predetermined at the design phase to a reference analog amount (V) of the A/D converter 41 predetermined at the design phase is set to a reference value. The analog signal from the reference cell 3 is adjusted to a suitable amount by the reference analog amount computation unit 43, and the adjusted amount is supplied to the A/D converter 41 as the reference analog amount.

The reference value which is used by the reference analog amount computation unit 43 for the computation of a reference analog amount is set to an identical value among a plurality of chips. This reference value is constant and does not vary by a temperature change. Hence, the photoelectric conversion device according to the embodiment shown FIG. 7 is capable of correcting the chip-by-chip variations of the current gain hFE of the phototransistors arranged in the pixel cell array 1 and the output errors due to the temperature dependency.

When a plurality of reference cells 3 are included, an average of data items acquired from some of the plurality of reference cells 3 may be used. Alternatively, in this case, one of respective data items acquired from the plurality of reference cells 3 may be selected and used according to a placement position of a corresponding pixel cell arranged in the pixel cell array 1. For example, a plurality of A/D converters 41 may be included and a corresponding number of reference cells 3 may be arranged for the respective A/D converters 41.

The data item acquired from the reference cell 3 reflects a temperature characteristic of the reference transistor included in the reference cell 3 at the present time. The reference value of the reference analog amount computation unit 43 is set appropriately so that the reference analog amount of A/D converter 41 may be an appropriate value in a temperature characteristic of a reference chip at a reference temperature.

When a temperature of the photoelectric conversion device according to this embodiment changes or when the characteristic of the pixel cell changes, the output from the reference cell 3 changes in accordance with the change. According to the change of the output from the reference cell 3, the reference analog amount which is computed by the reference analog amount computation unit 43 and supplied to the A/D converter 41 also changes. Hence, the digital output of the A/D converter 41 based on the output of the pixel cell arranged in the pixel cell array 1 is corrected to a suitable value.

In the photoelectric conversion device according to the embodiment shown in FIG. 2 and the photoelectric conversion device according to the embodiment shown in FIG. 5, the correction data item from the reference cell 3 is used without forming a feedback loop, and the problem of the stability of a feedback loop and the problem of a time lag may not take place. Further, the photoelectric conversion devices according to these embodiments acquire the correction data item in real time and utilize the correction data item and it is possible to promptly take corrective measures to environmental changes, in contrast to the case of the generally known photoelectric conversion device shown in FIG. 11.

Figure 8:
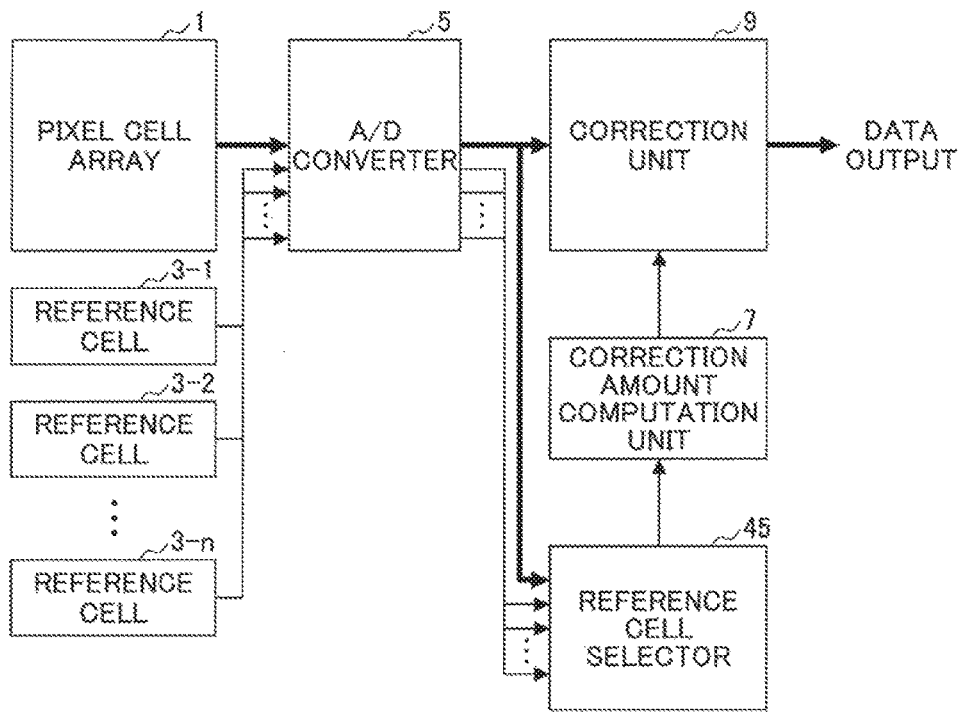
FIG. 8 is a block diagram of a photoelectric conversion device according to another embodiment.

FIG. 8 is a block diagram of a photoelectric conversion device according to another embodiment. In FIG. 8, the elements which are essentially the same as corresponding elements in the photoelectric conversion device shown in FIG. 1 are designated by the same reference numerals, and a description thereof will be omitted.

As shown in FIG. 8, the photoelectric conversion device of this embodiment includes the pixel cell array 1, a plurality of reference cells 3-1, 3-2, ..., 3-n, the A/D converter 5, the correction amount computation unit 7, the correction unit 9, and a reference cell selector 45. The "n" denotes a positive integer greater than 2.

For example, each of the reference cells 3-1, 3-2, ..., 3-n is implemented by the reference cell 31a shown in FIG. 5, and mutually different base potentials are supplied to the base regions of the reference transistors 33 of the respective reference cells. The amounts of the emitter output currents are different from one another because of the mutually different base potentials supplied to the reference cells 3-1, 3-2, ..., 3-n.

Analog outputs of the reference cells 3-1, 3-2, ..., 3-n are converted into digital outputs by the A/D converter 5, and these digital outputs are supplied to the reference cell selector 45. The amounts of the digital outputs of the reference cells 3-1, 3-2, ..., 3-n supplied to the reference cell selector 45 are different from one another. The digital outputs which are generated from the analog outputs of the pixel cells arranged in the pixel cell array 1 by the A/D converter 5 are also supplied to the reference cell selector 45. Note that the A/D converter 5 performs the same A/D conversion for the analog outputs of the pixel cells arranged in the pixel cell array 1 and for the analog outputs of the reference cells 3-1, 3-2, ..., 3-n.

The reference cell selector 45 is configured to select one of the reference cells 3-1, 3-2, ..., 3-n according to the digital signal value obtained by the A/D conversion of the current from the phototransistor of a corresponding pixel cell. For example, the reference cell selector 45 selects one of the reference cells 3-1, 3-2, ..., 3-n having a digital signal value obtained by the A/D conversion of the analog output of the reference cell which is nearest to the digital signal value obtained by the A/D conversion of the analog output of the corresponding pixel cell.

The correction amount computation unit 7 is configured to compute the gain supplied to the correction unit 9 by using the output of the reference cell selected by the reference cell selector 45. The correction unit 9 is configured to correct the digital output value (which is generated from the analog output of the pixel cell arranged in the pixel cell array 1 by the A/D converter 5) based on the gain (the correction amount) computed by the correction amount computation unit 7.

Figure 9:
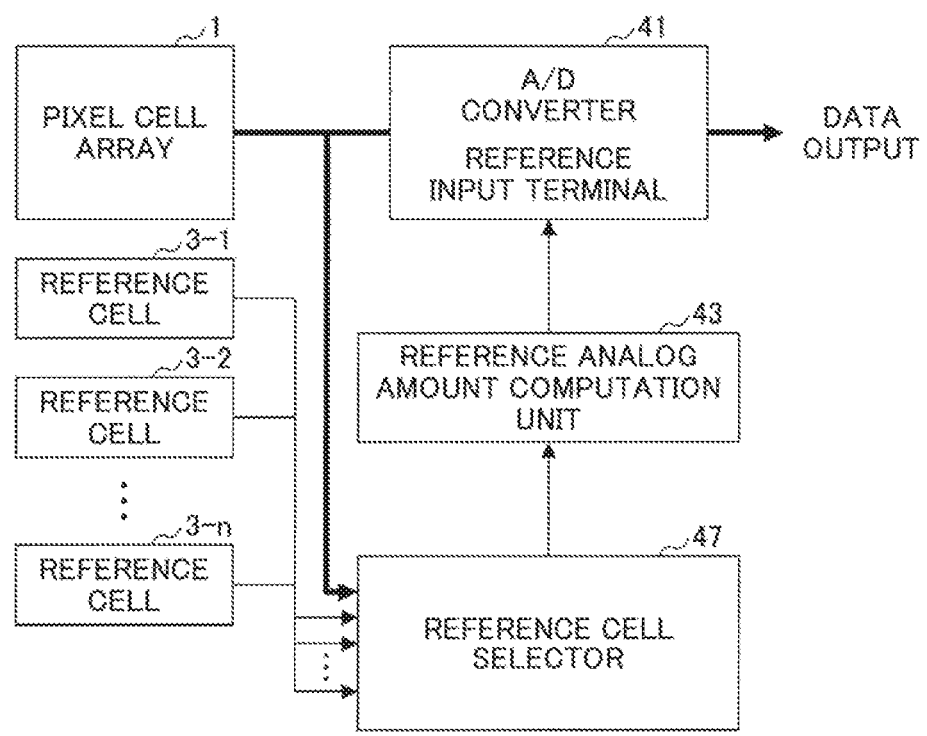
FIG. 9 is a block diagram of a photoelectric conversion device according to another embodiment.

FIG. 9 is a block diagram of a photoelectric conversion device according to another embodiment. In FIG. 9, the elements which are essentially the same as corresponding elements in the photoelectric conversion device shown in FIG. 7 or FIG. 8 are designated by the same reference numerals, and a description thereof will be omitted.

As shown in FIG. 9, the photoelectric conversion device of this embodiment includes the pixel cell array 1, the plurality of reference cells 3-1, 3-2, ..., 3-n, the A/D converter 41, the reference analog amount computation unit 43, and a reference cell selector 47. The plurality of reference cells 3-1, 3-2, . . . , 3-n are the same as those of the electric conversion device shown in FIG. 8.

The analog output (current) of the pixel cell arranged in the pixel cell array 1 and the analog outputs (current) of the reference cells 3-1, 3-2, . . . , 3-n are supplied to the reference cell selector 47. The amounts of the analog outputs of the reference cells 3-1, 3-2, . . . , 3-n supplied to the reference cell selector 47 are different from one another.

The reference cell selector 47 is configured to select one of the reference cells 3-1, 3-2, . . . , 3-n according to the amount of the current from the phototransistor of a corresponding pixel cell. For example, the reference cell selector 47 selects one of the reference cells 3-1, 3-2, . . . , 3-n having a current value of the reference cell which is nearest to the current value from the phototransistor of the corresponding pixel cell.

The reference analog amount computation unit 43 is configured to compute a reference analog amount of the A/D converter 41 by using the output of the reference cell selected by the reference cell selector 47. The A/D converter 41 is configured to convert the analog output of the pixel cell arranged in the pixel cell array 1 into a digital output based on the reference analog amount computed by the reference analog amount computation unit 43.

In the photoelectric conversion device according to the embodiment shown in FIG. 8 and the photoelectric conversion device according to the embodiment shown in FIG. 9, it is also possible to correct the errors due to changes of the current gain according to changes of the emitter output current of the phototransistor.

Figure 10:
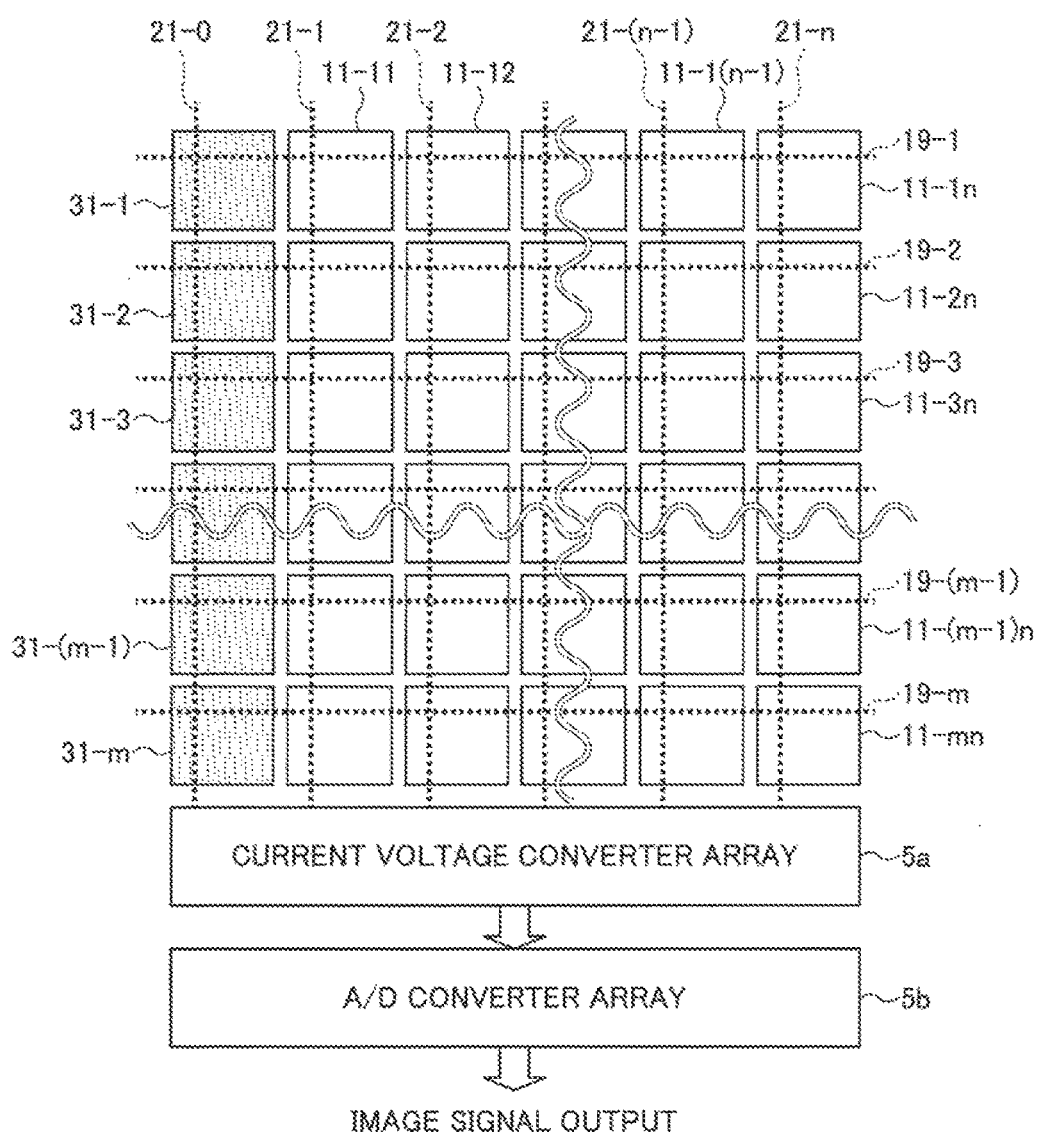
FIG. 10 is a block diagram of an example of a photoelectric conversion array in the photoelectric conversion device.

A photoelectric conversion array may be formed by arranging a plurality of pixel cells each having the photoelectric conversion function as shown in FIG. 2 or FIG. 3 in rows and columns in two-dimensional directions, so that an image sensor including the photoelectric conversion array may be formed. FIG. 10 is a block diagram of an example of a photoelectric conversion array in a photoelectric conversion device according to one embodiment.

In the photoelectric conversion array shown in FIG. 10, a plurality of pixel cells 11-11, 11-12, . . . , 11-mn ("m" and "n" denote positive integers) are arrayed in rows and columns in two-dimensional directions. For example, each of the plurality of pixel cells 11-11, 11-12, . . . , 11-mn is formed to have a configuration which is the same as that of the pixel cell 11 shown in FIG. 2.

In the photoelectric conversion array shown in FIG. 10, a number of reference cells 31-1, 31-2, . . . , 31-m are arrayed in one column along with the columns of the pixel cells. For example, each of the number of reference cells 31-1, 31-2, . . . , 31-m is formed to have a configuration which is the same as that of the reference cell 31 shown in FIG. 4. For example, the column of the reference cells 31-1, 31-2, . . . , 31-m is placed at a left end of the columns of the pixel cells 11-11, 11-12, . . . , 11-mn.

In the photoelectric conversion array shown in FIG. 10, row selection lines 19-1, 19-2, . . . , 19-m and column current output lines 21-0, 21-1, . . . , 21-n are provided in accordance with the arrangement of the pixel cells 11-11, 11-12, . . . , 11-mn and the reference cells 31-1, 31-2, . . . , 31-m.

The output current from each of the pixel cells and the reference cells is converted into voltage by a current voltage converter array 5a and the voltage is input to an A/D converter array 5b. The input voltage is converted into a digital data item by the A/D converter array 5b and the A/D converter array 5b outputs the digital data item as an image signal data item. Similar to the pixel cells which output light intensities, the reference cells output data items and the data items are converted into digital signals REF by the A/D converter array 5b.

In the photoelectric conversion array shown in FIG. 10, correction values are computed based on the data items output from the reference cells among the image signal data items output from the A/D converter array 5b, and the image signal data items of the pixel cells (which output the light intensities) are corrected based on the correction values.

In the photoelectric conversion array according to this embodiment, it is assumed that the power consumption of the A/D converter array 5b is great and the temperature of the chip only in the portion of the A/D converter array 5b is high. In this case, a temperature gradient in which the temperature is lowered in a direction that goes away from the A/D converter array 5b is formed in the chip.

When the reference cells are arrayed in one column like the photoelectric conversion array according to this embodiment, there is a strong correspondence between a temperature of a pixel cell of one of the rows of the array and a temperature of a reference cell of the same row. Hence, the output error of the pixel cell due to the temperature gradient in the chip may be reduced effectively by correcting the output of the pixel cell of the one of the rows of the array based on the data item of the reference cell of the same row.

The arrangement of the reference cells shown in FIG. 10 is exemplary and explanatory. How the reference cells are arrayed, which data items of the pixel cells are to be corrected, and which data items of the reference cells are to be used for the correction are not limited to the above-described embodiments.

As described in the foregoing, in the photoelectric conversion device using the phototransistor as the photoelectric conversion element according to the present invention, it is possible to correct the chip-by-chip variations of the current gain hFE of the phototransistor and the output errors due to the temperature dependency.

The photoelectric conversion device according to the invention is not limited to the above-described embodiments, and variations and modifications may be made without departing from the scope of the present invention.

What is claimed is:

1. A photoelectric conversion device comprising:
   a pixel cell including a phototransistor;
   a reference cell including a reference transistor having a temperature characteristic identical to that of the phototransistor and having a fixed electrical state;
   an analog-to-digital converter configured to convert an analog output of the pixel cell into a digital output;
   a correction amount computation unit configured to compute a correction amount for the digital output of the analog-to-digital converter based on a ratio of a reference value to an output of the reference cell; and
   a correction unit configured to correct the digital output of the analog-to-digital converter based on the correction amount.

2. The photoelectric conversion device according to claim 1, wherein
   the analog-to-digital converter is configured to convert an analog output signal of the reference cell into a digital signal, and
   the correction amount computation unit is configured to compute the correction amount based on a digital signal generated by conversion of an analog output signal of the reference cell, and the reference value.

3. The photoelectric conversion device according to claim 1, wherein the photoelectric conversion device includes a plurality of pixel cells, each being identical to the pixel cell, and a plurality of reference cells, each being identical to the reference cell, wherein the correction amount computation unit is configured to compute a correction amount for one of the plurality of pixel cells based on an output of one of the plurality of reference cells selected according to a placement position of the one of the plurality of pixel cells, and the reference value.

4. The photoelectric conversion device according to claim 1, wherein a base region of the reference transistor included in the reference cell is connected to a terminal to which a predetermined base potential for the base region of the reference transistor is supplied from an external device.

5. An image generation device comprising the photoelectric conversion device according to claim 1.

6. A method of correcting an output of a photoelectric conversion device, comprising:

arranging in the photoelectric conversion device a pixel cell including a phototransistor, and a reference cell including a reference transistor having a temperature characteristic identical to that of the phototransistor and having a fixed electrical state; and correcting an output of the pixel cell based on an output of the reference cell and a reference value which does not vary with temperature.

7. A photoelectric conversion device comprising:

a pixel cell including a phototransistor;

a reference cell including a reference transistor having a temperature characteristic identical to that of the phototransistor and having a fixed electrical state;

an analog-to-digital converter configured to convert an analog output of the pixel cell into a digital output;

a correction amount computation unit configured to compute a correction amount for the digital output of the analog-to-digital converter based on an output of the reference cell and a reference value which does not vary with temperature; and a correction unit configured to correct the digital output of the analog-to-digital converter based on the correction amount computed from the output of the reference cell and the reference value which does not vary with temperature.

8. The photoelectric conversion device according to claim 7, wherein the analog-to-digital converter is configured to convert an analog output signal of the reference cell into a digital signal, and the correction amount computation unit is configured to compute the correction amount based on a digital signal generated by conversion of an analog output signal of the reference cell, and the reference value.

9. The photoelectric conversion device according to claim 7, wherein the photoelectric conversion device includes a plurality of pixel cells, each being identical to the pixel cell, and a plurality of reference cells, each being identical to the reference cell, wherein the correction amount computation unit is configured to compute a correction amount for one of the plurality of pixel cells based on an output of one of the plurality of reference cells selected according to a placement position of the one of the plurality of pixel cells, and the reference value.

10. The photoelectric conversion device according to claim 7, wherein a base region of the reference transistor included in the reference cell is connected to a terminal to which a predetermined base potential for the base region of the reference transistor is supplied from an external device.

11. An image generation device comprising the photoelectric conversion device according to claim 7.

12. The photoelectric conversion device according to claim 7, wherein the photoelectric conversion device further includes:

a plurality of reference cells including reference transistors in which mutually different base potentials are supplied to base regions of the reference transistors and the reference transistors have different output characteristics; and a reference cell selector configured to select one of the plurality of reference cells in response to an amount of an emitter output current of the pixel cell, and wherein the correction amount computation unit computes the correction amount based on an output of one of the plurality of reference cells selected by the reference cell selector.

* * * * *